M. B. GIBERSON.
VEHICLE WHEEL.
APPLICATION FILED FEB. 14, 1916.
1,232,275.
Patented July 3, 1917.
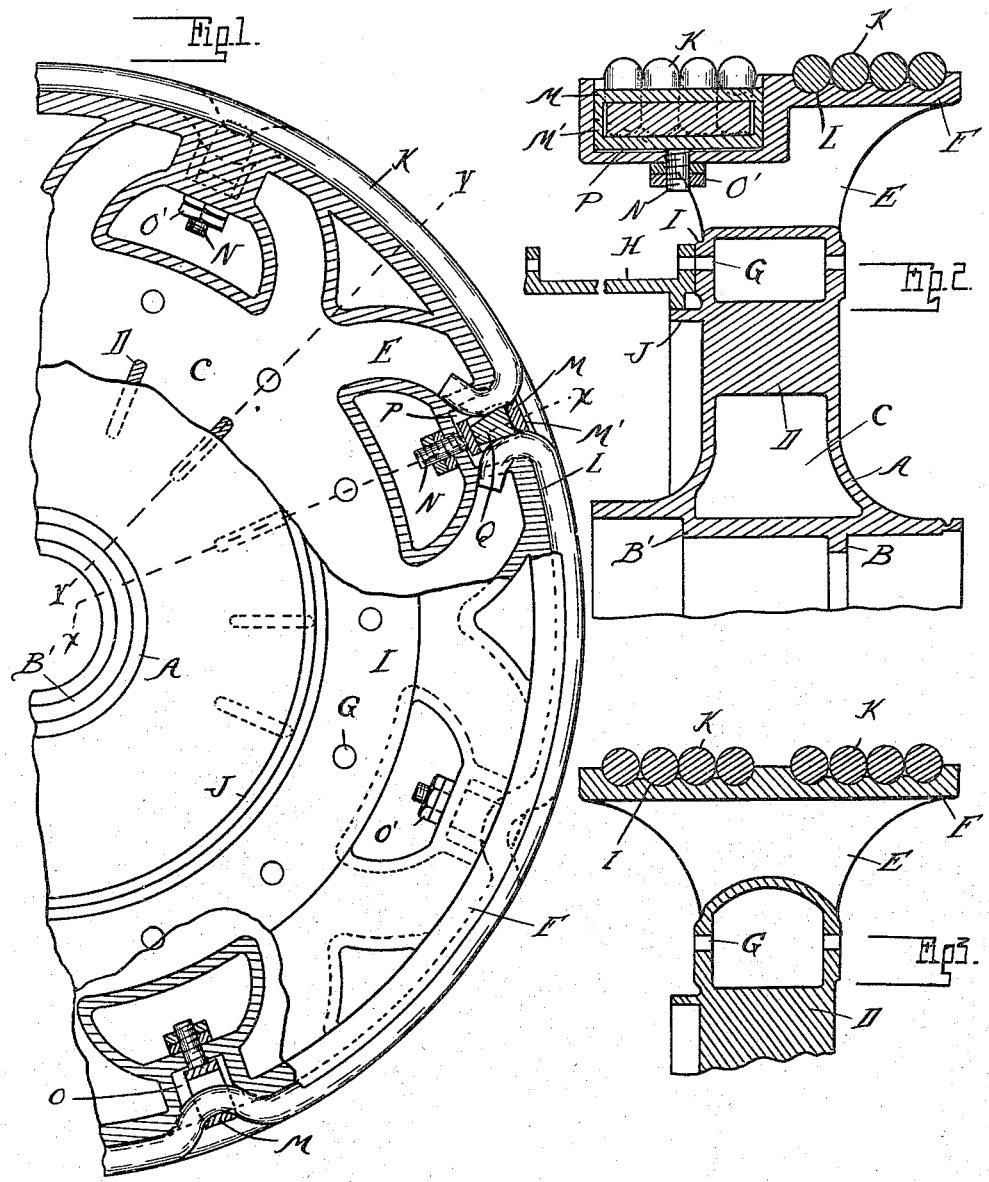
Inventor
Mason B. Giberson
By Whittemore Hulbert & Whittemore
Attorneys

UNITED STATES PATENT OFFICE.

MASON B. GIBERSON, OF DETROIT, MICHIGAN, ASSIGNOR TO JOSEPH S. STRINGHAM, OF DETROIT, MICHIGAN.

VEHICLE-WHEEL.

1,232,275.   Specification of Letters Patent.   Patented July 3, 1917.

Application filed February 14, 1916. Serial No. 78,159.

*To all whom it may concern:*

Be it known that I, MASON B. GIBERSON, a citizen of the United States of America, residing at Detroit, in the county of Wayne and State of Michigan, have invented certain new and useful Improvements in Vehicle-Wheels, of which the following is a specification, reference being had therein to the accompanying drawings.

The invention relates to vehicle wheels of that type formed from cast metal, and has particular reference to various features of construction in the wheel and means employed for securing the tire thereto; also the combination of a novel construction of tire with said wheel as hereinafter set forth.

In the drawings:

Figure 1 is a sectional elevation of a portion of the wheel showing the tire secured thereto;

Fig. 2 is a cross-section on line $x$—$x$ Fig. 1;

Fig. 3 is a cross-section on line $y$—$y$ Fig. 1.

A is a hub of barrel form and provided with bearings B and B' for the axle. Surrounding this hub portion is a hollow annular portion C having radially-extending cross-ribs D for strengthening the opposite side walls thereof. E are tubular spoke portions extending outward from the annular portion C and inclining oppositely in the plane of the wheel. F is a rim into which the spoke portions E merge.

Where it is desired to secure a brake-drum upon the wheel, this may be accomplished by providing the outer annular portion C with a series of apertures G for receiving clamping bolts, by means of which the brake-drum H may be fastened to the wheel. There are also preferably arranged a series of bosses I at the side of the portion C, which may be machined to form a bearing for the flange of the drum and outwardly-extending flange J which may be machined concentric with the axis of the wheel to hold the drum also in concentric relation.

The tire K for this wheel is preferably formed of a series of parallel strands of rope or other fibrous material, which are laid in grooves L in the periphery of the rim, extending circumferentially therearound. To hold the tire to the rim a series of clamping devices M are arranged at intervals, each clamping device extending transversely across one-half of the tire and being staggered in relation to the clamping device for the opposite half. In detail each clamping device M includes a strap or loop M' having an inwardly-extending threaded shank N. The rim is formed with a recess O for receiving this strap and is also apertured for the passage of the shank N, while clamping nuts O' are provided for drawing the shank inward. Thus by threading the rope strands through the straps or loops M' and then drawing the latter inward by the clamping nuts O', said strands will be securely fastened and also placed under tension.

At one point in the circumference it is necessary to secure the ends of the strands, and for this purpose I have provided a recessed bearing P of tapering cross-section, while a coöperating wedge Q is provided for clamping the ropes against this bearing. The wedge Q may be placed in engagement with one of the straps M' and drawn inward by the shank N thereof, in a similar manner to the arrangement for the intermediate straps.

With the construction as described to secure the tire to the wheel the rope strands are first threaded through the several straps and their ends are tucked into the tapering recess P. If desired, this recess may be cut away so that the ends of the strands may be passed through the rim, as shown in Fig. 1. The wedge Q being engaged with the strap M' and the shank N being passed through the aperture in the rim the nuts O' are tightened so as to wedge and clamp the rope ends. The intermediate straps may then be tightened, which will draw all portions of the rope tire in firm contact with the grooved seat in the periphery of the rim, and inasmuch as these straps extend but half way across the tire and are staggered in relation to each other, the circular form of the tire is maintained. Whenever it is necessary to renew the tire, this may be accomplished by merely loosening the nuts and threading new strands through the straps.

What I claim as my invention is:—

1. The combination with a wheel, of a tire therefor, comprising a series of parallel strands extending around the periphery of the wheel, said periphery being provided with recesses therein at intervals, and clamps for securing said tire extending transversely across a plurality of the strands, each clamp comprising a strap embracing the strands and drawing the same down into the recess in the wheel, and the clamps for one portion of the strands being staggered in relation to those for another plurality to preserve the continuity of the circle.

2. The combination with a vehicle wheel having a rim or peripheral portion provided with parallel annular grooves, of a tire formed of a series of strands of fibrous material extending around in said parallel grooves, the ends of said strands being tucked into a recess in said wheel, and a wedge clamp for securing said ends of the strands.

3. The combination with a wheel having a rim portion provided with parallel circumferential grooves and with recesses at intervals extending transversely thereacross, of a tire comprising a series of strands of fibrous material engaging said parallel grooves, the ends of said strands being tucked into one of said recesses, a wedge clamping device for securing the ends of said strands, and intermediate clamping devices through which said strands are threaded engaging the other recesses in said rim.

4. The combination with a wheel, having a plurality of recesses in the periphery thereof, extending partially thereacross and staggered in relation to each other to preserve the continuity of the circle, of a tire for said wheel, comprising a series of substantially parallel strands extending around the periphery and clamps extending within said recesses for drawing said strands down into the recesses to secure the same to the wheel, each clamp extending transversely across a plurality of the strands.

In testimony whereof I affix my signature.

MASON B. GIBERSON.

Copies of this patent may be obtained for five cents each, by addressing the "Commissioner of Patents, Washington, D. C."